United States Patent
Tsai (10) Patent No.: US 11,226,052 B2
(45) Date of Patent: Jan. 18, 2022

(54) ELECTRIC VALVE

(71) Applicant: Global One Tech Corporation, Taichung (TW)

(72) Inventor: Tien-Shou Tsai, Taichung (TW)

(73) Assignee: GLOBAL ONE TECH CORPORATION, Taichung (TW)

( * ) Notice: Subject to any disclaimer, the term of this patent is extended or adjusted under 35 U.S.C. 154(b) by 0 days.

(21) Appl. No.: 17/105,079

(22) Filed: Nov. 25, 2020

(65) Prior Publication Data
US 2021/0164580 A1  Jun. 3, 2021

(51) Int. Cl.
*F16K 31/04* (2006.01)
*F16H 57/02* (2012.01)
*F16K 5/04* (2006.01)

(52) U.S. Cl.
CPC ........... *F16K 31/041* (2013.01); *F16H 57/02* (2013.01); *F16K 5/0407* (2013.01)

(58) Field of Classification Search
CPC ....... F16K 31/041; F16K 5/0407; F16H 57/02
See application file for complete search history.

(56) References Cited

U.S. PATENT DOCUMENTS

| | | | |
|---|---|---|---|
| 2013/0043416 A1* | 2/2013 | Endt | F16K 31/055 251/129.11 |
| 2018/0031142 A1* | 2/2018 | Hillo | F16K 31/042 |
| 2019/0072200 A1* | 3/2019 | Chen | F16K 31/041 |
| 2019/0309862 A1* | 10/2019 | Yu | F16K 31/535 |

* cited by examiner

*Primary Examiner* — Kevin R Barss
(74) *Attorney, Agent, or Firm* — Ladas & Parry, LLP (57) ABSTRACT

An electric valve includes a valve member switchable between a closing state to close a flow passageway of a valve body and an opening state to open the passageway. An adaptor is connected to the valve member. A motor drives rotation of a rotation shaft connected to the adaptor. A circuit board is electrically coupled to the motor and a backup battery pack. A microprocessor control unit is electrically coupled to the circuit board. The motor drives the valve member through the rotation shaft and the adaptor to switch between the opening and closing states. The microprocessor control unit controls a time delay for switching the valve member from the opening state to the closing state.

6 Claims, 10 Drawing Sheets

ELECTRIC VALVE

CROSS-REFERENCE TO RELATED APPLICATION

This application claims priority to Taiwanese Patent Application No. 108215938, filed on Nov. 29, 2019.

FIELD

The disclosure relates to a valve, and more particularly to an electric valve.

BACKGROUND

The conventional electric valve is electrically switchable from an opening state to a closing state for a fluid flow therethrough. In use, after receiving a valve close signal, the conventional electric valve immediately switches from the opening state to the closing state so that the fluid flow is immediately stopped from passing through the conventional electric valve. Because there is no time delay for the conventional electric valve to switch from the opening state to the closing state, the conventional electric valve is unable to control an amount of the fluid flow therethrough after receiving the valve close signal. In addition, during a power outage, the conventional electric valve cannot function and has to be operated by hand.

SUMMARY

Therefore, an object of the disclosure is to provide an electric valve that can alleviate at least one of the drawbacks of the prior art.

According to the disclosure, an electric valve includes a valve unit, an adaptor, and a drive unit.

The valve unit includes a valve body and a valve member rotatably disposed in the valve body. The valve body has a flow passageway. The valve member has a driven portion extending outside of the valve body. The valve member is switchable between a closing state to close the flow passageway and an opening state to open the passageway.

The adaptor has a first adaptor portion connected to the driven portion of the valve member, and a second adaptor portion opposite to the first adaptor portion.

The drive unit includes a rotation shaft, a motor, a backup battery pack, a circuit board, and a microprocessor control unit. The rotation shaft has a driving portion connected to the second adaptor portion of the adaptor. The motor drives rotation of the rotation shaft. The circuit board is electrically coupled to the motor is and the backup battery pack. The microprocessor control unit is disposed on and electrically coupled to the circuit board.

The motor drives the valve member through the rotation shaft and the second adaptor portion to switch between the opening and closing states.

The microprocessor control unit controls a time delay for switching the valve member from the opening state to the closing state.

BRIEF DESCRIPTION OF THE DRAWINGS

Other features and advantages of the disclosure will become apparent in the following detailed description of the embodiment, with reference to the accompanying drawings, of which.

DETAILED DESCRIPTION

Figure 1:
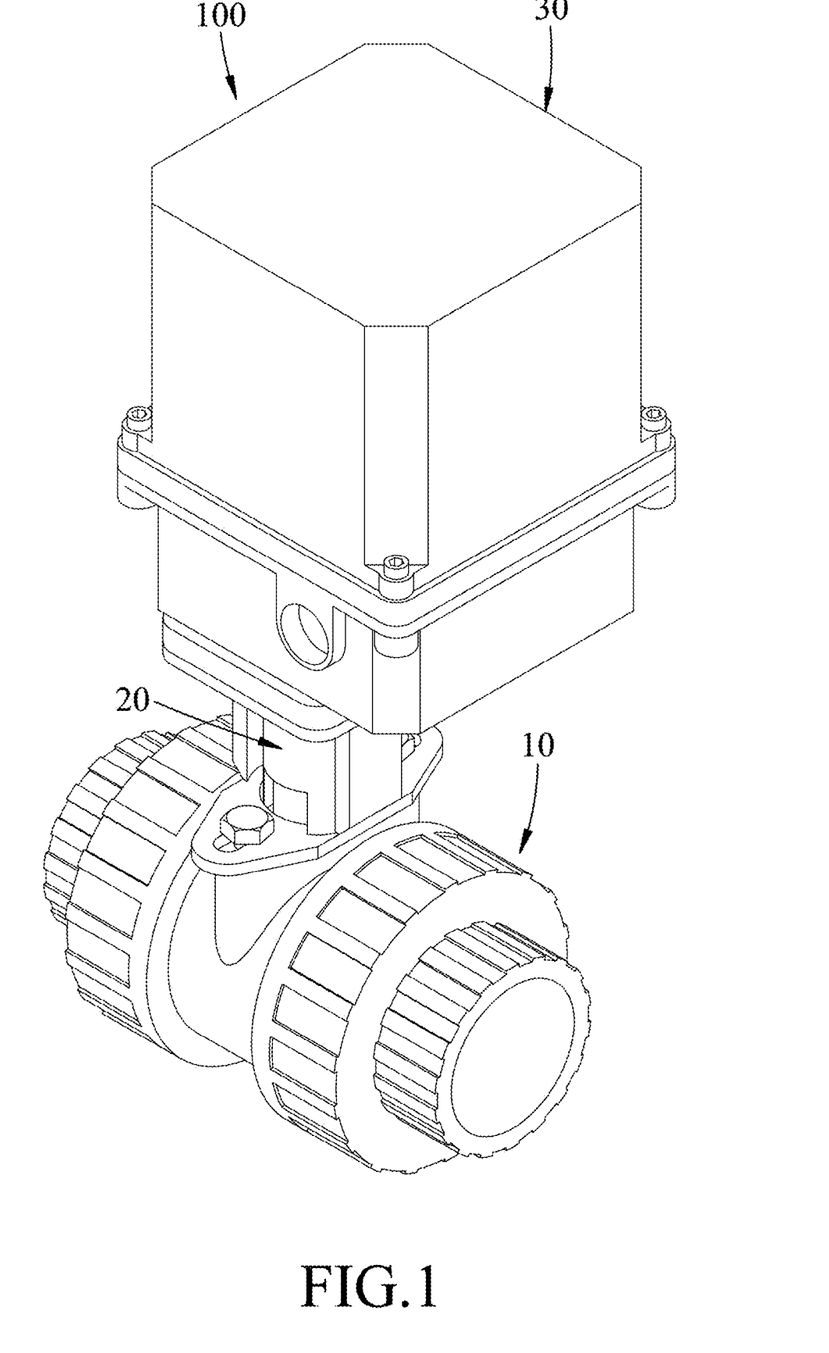
FIG. 1 is a perspective view illustrating an electric valve according to an embodiment of the disclosure.
Figure 2:
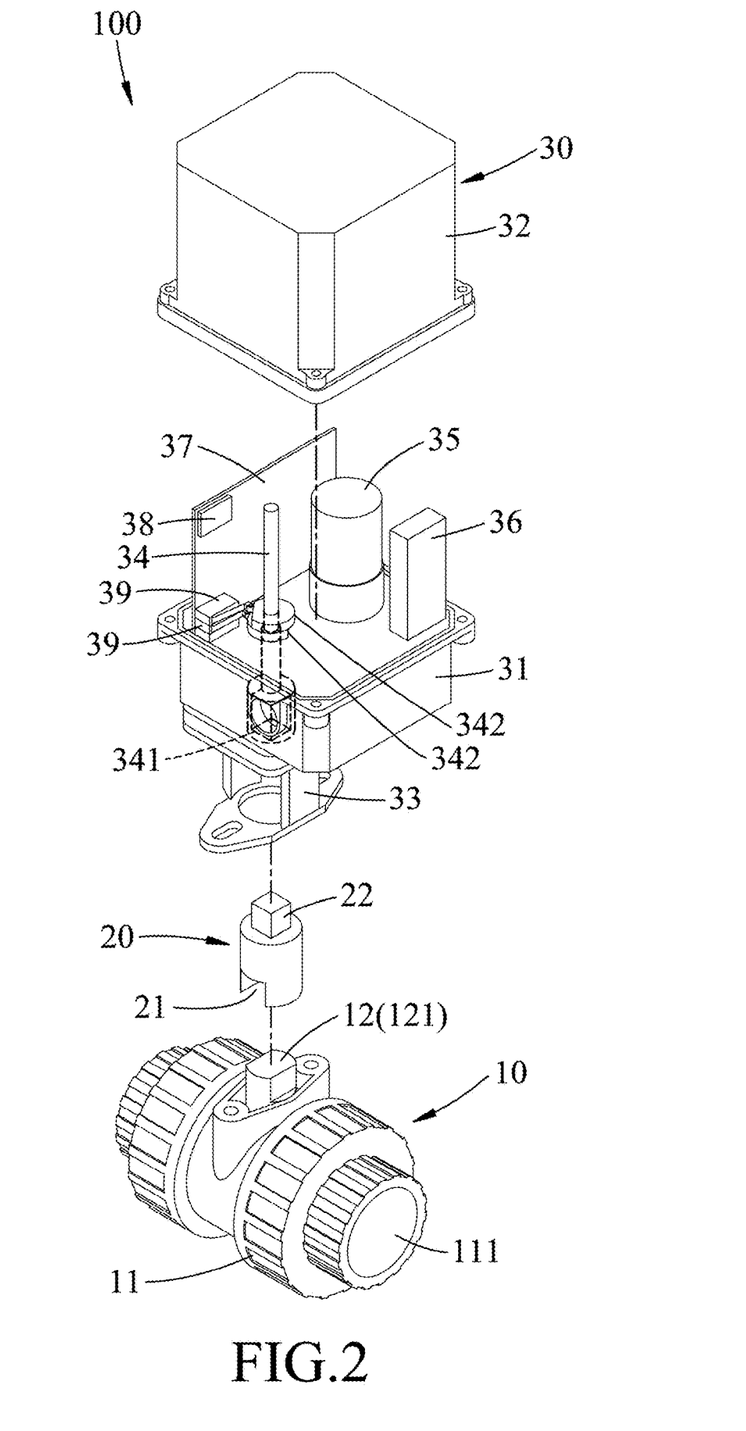
FIG. 2 is an exploded perspective view of the embodiment.
Figure 3:
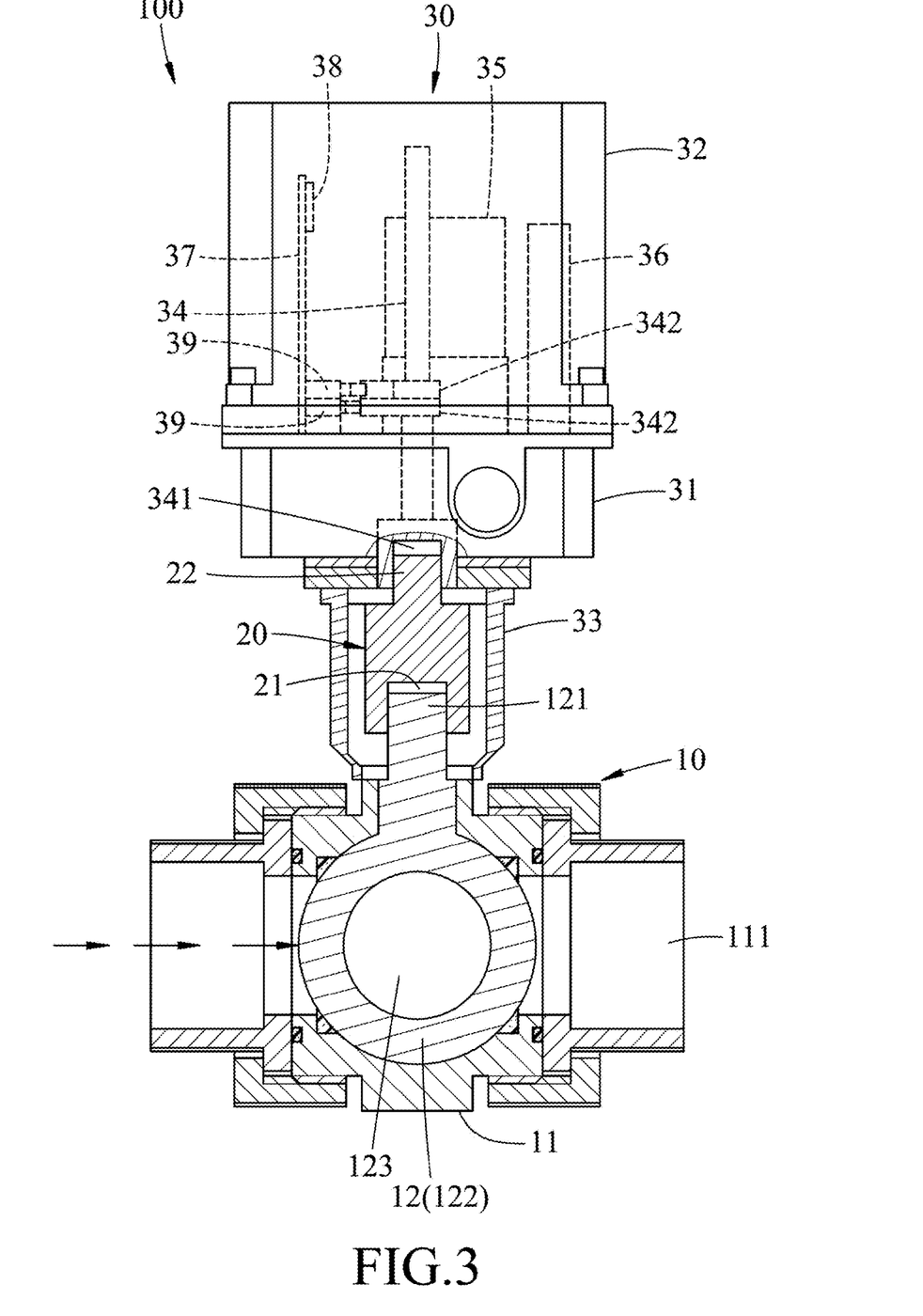
FIG. 3 is a partly sectional view illustrating a valve unit of the electric valve that is a ball valve in a closing state.

FIGS. 1 to 3 illustrate an electric valve 100 according to an embodiment of the disclosure. The electric valve 100 includes a valve unit 10, an adaptor 20, and a drive unit 30.

The valve unit 10 is a ball valve that includes a valve body 11 and a valve member 12 rotatably disposed in the valve body 11.

The valve body 11 has a flow passageway 111.

The valve member 12 has a driven portion 121 extending outside of the valve body 11, and a ball-shaped blocker 122 connected to the driven portion 121 and disposed in the flow passageway 111. The driven portion 121 has a protruding block. The ball-shaped blocker 122 has a passage hole 123.

Figure 4:
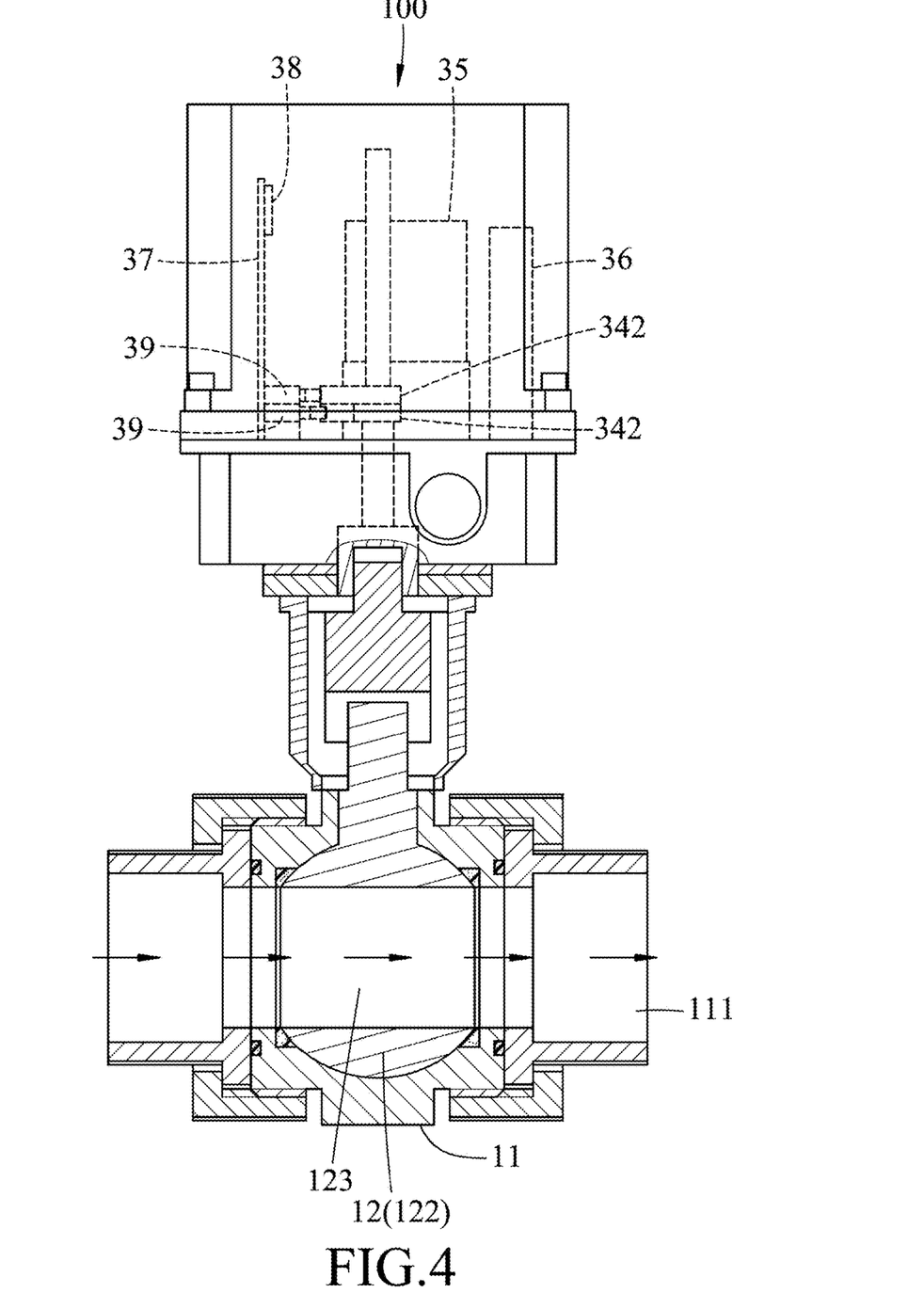
FIG. 4 is similar to FIG. 3, but illustrating the valve unit in an opening state.

The valve member 12 is switchable between a closing state to close the flow passageway 111 and an opening state to open the passageway 111. As shown in FIG. 3, in close state of the valve member 12, the ball-shaped blocker 122 closes the passageway 111. As shown in FIG. 4, in the opening state of the valve member 12, the passage hole 123 of the ball-shaped blocker 122 fluidly communicates with passageway 111.

As shown in FIGS. 1 to 3, the adaptor 20 has a first adaptor portion 21 connected to the driven portion 121 of the valve member 12, and a second adaptor portion 22 opposite to the first adaptor portion 21. The first adaptor portion 21 of the adaptor 20 has a groove to complementarily engage the protruding block of the driven portion 121. The second adaptor portion 22 of the adaptor 20 has a protruding block.

The drive unit 30 includes a reduction gearbox 31, a casing 32, a holding bracket 33, a rotation shaft 34, a motor 35, a backup battery pack 36, a circuit board 37, a microprocessor control unit 38, and two microswitches 39.

The casing 32 covers a top side of the reduction gearbox 31.

The holding bracket 33 is disposed at a bottom side of the reduction gearbox 31 and connected to the valve body 11.

The rotation shaft 34 is partially received in and extends outside of the reduction gear box 31. In this embodiment, the rotation shaft 34 has a driving portion 341 and two microswitch contact portions 342. Below the top side of the reduction gear box 31, the driving portion 341 has a groove to complementarily engage the protruding block of the second adaptor portion 22. The microswitch contact portions 342 are disposed above the the top side of the reduction gear box 31.

The circuit board 37 is disposed on the top side of the reduction gearbox 31.

The motor 35 is electrically coupled to the circuit board 37 and is disposed on the top side of the reduction gearbox 31. The rotation shaft 34 is driven by the motor 35 through the reduction gearbox 31. The motor 35 drives the valve member 12 via a gear mechanism (not shewn) disposed inside the reduction gearbox 31, the rotation shaft 34 and the second adaptor portion 22 to switch between the opening (see FIG. 4) and closing states (see FIG. 3).

The backup battery pack 36 is disposed on the top side of the reduction gearbox 31 and is electrically coupled to the circuit board 37.

The microprocessor control unit 38 is disposed on and electrically coupled to the circuit board 37. The microprocessor control unit 38 controls a time delay for switching the valve member 12 from the opening state (FIG. 4) to the closing state (FIG. 3) 12. In this embodiment, the microprocessor control unit 38 provides a settable time delay that has range, but not limited, between 3 and 50 seconds.

The microswitches 39 are disposed on and electrically coupled to the circuit board 37.

Referring back to FIGS. 2 to 4, when the valve member 12 switches to the closing state, one of the microswitch contact portions 342 abuts and triggers one of the microswicthes 39 so that the microprocessor control unit 38 receives a signal that the valve member 12 is at the closing state. When the valve member 12 switches to the opening state, another microswitch contact portion 342 abuts and triggers another microswitch 39 so that the microprocessor control unit 38 receives a signal that the valve member 12 is at the opening state.

In use, the circuit board 37 is electrically coupled to an external sensor (not shown), such as an ultrasonic sensor or an infrared sensor. During the opening state of the valve member 12, when the external sensor transmits a valve close signal to the microprocessor control unit 38 through the circuit board 37, the microprocessor control unit 38 controls the valve member 12 so that the valve member 12 switches from the opening state to the closing state after a period of time delay set by the microprocessor control unit 38. Therefore, after receiving the valve close signal, the electric valve 100 can effectively control an amount of fluid flowing through the passageway 111 to satisfy different usage requirements.

In case of power outage, the backup battery pack 36 can supply power to the motor 35 through the circuit board 37 to maintain the normal operation of the valve member 12, so that no manual operation is needed for the valve member 12 to switch between the opening and closing states.

Figure 5:
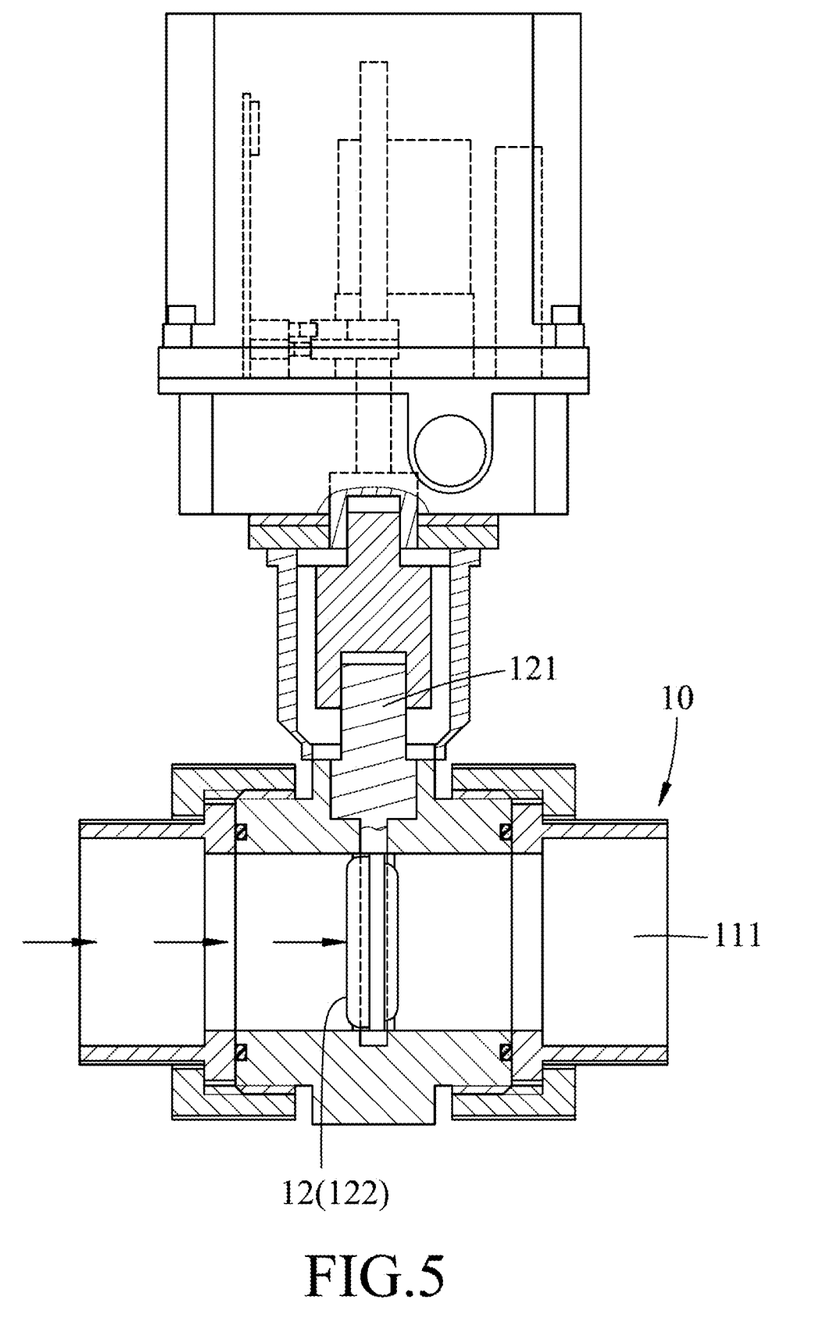
FIG. 5 is a partly sectional view illustrating a variation of the valve unit that is a rotary valve in a closing state.
Figure 6:
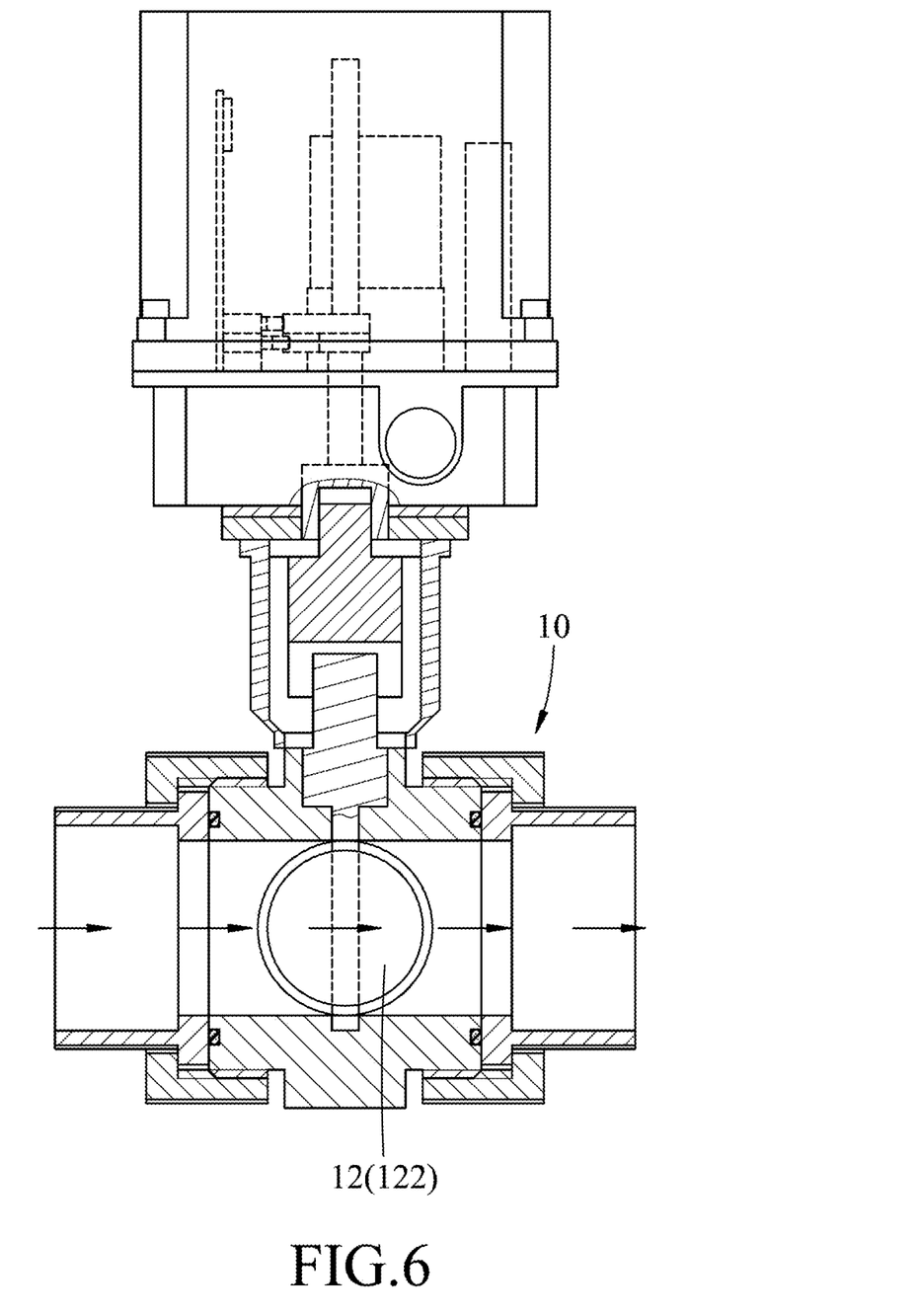
FIG. 6 is similar to FIG. 5, but illustrating the valve unit in an opening state.

FIGS. 5 and 6 illustrate a variant of the valve unit 10 according to the disclosure. The valve unit is a rotary valve. The valve member 12 has a disc-shaped blocker 122 disposed in the flow passageway 111 and connected to the driven portion 121 of the valve member 12. The valve member 12 is switchable between the closing state (see FIG. 5) and the opening state (see FIG. 6).

Figure 7:
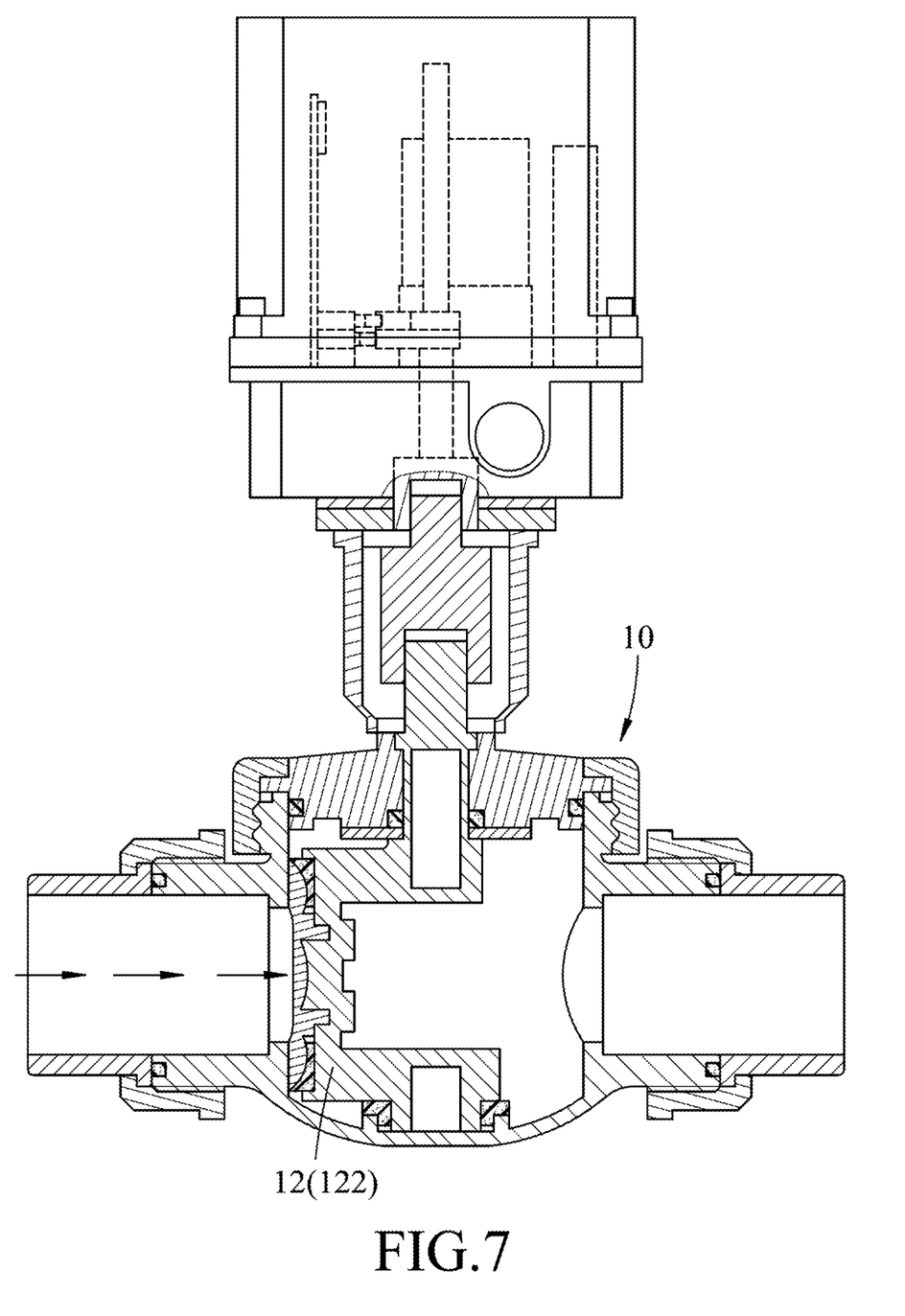
FIG. 7 is a partly sectional view illustrating another variation of the valve unit that is a semi-cylindrical valve in a closing state.
Figure 8:
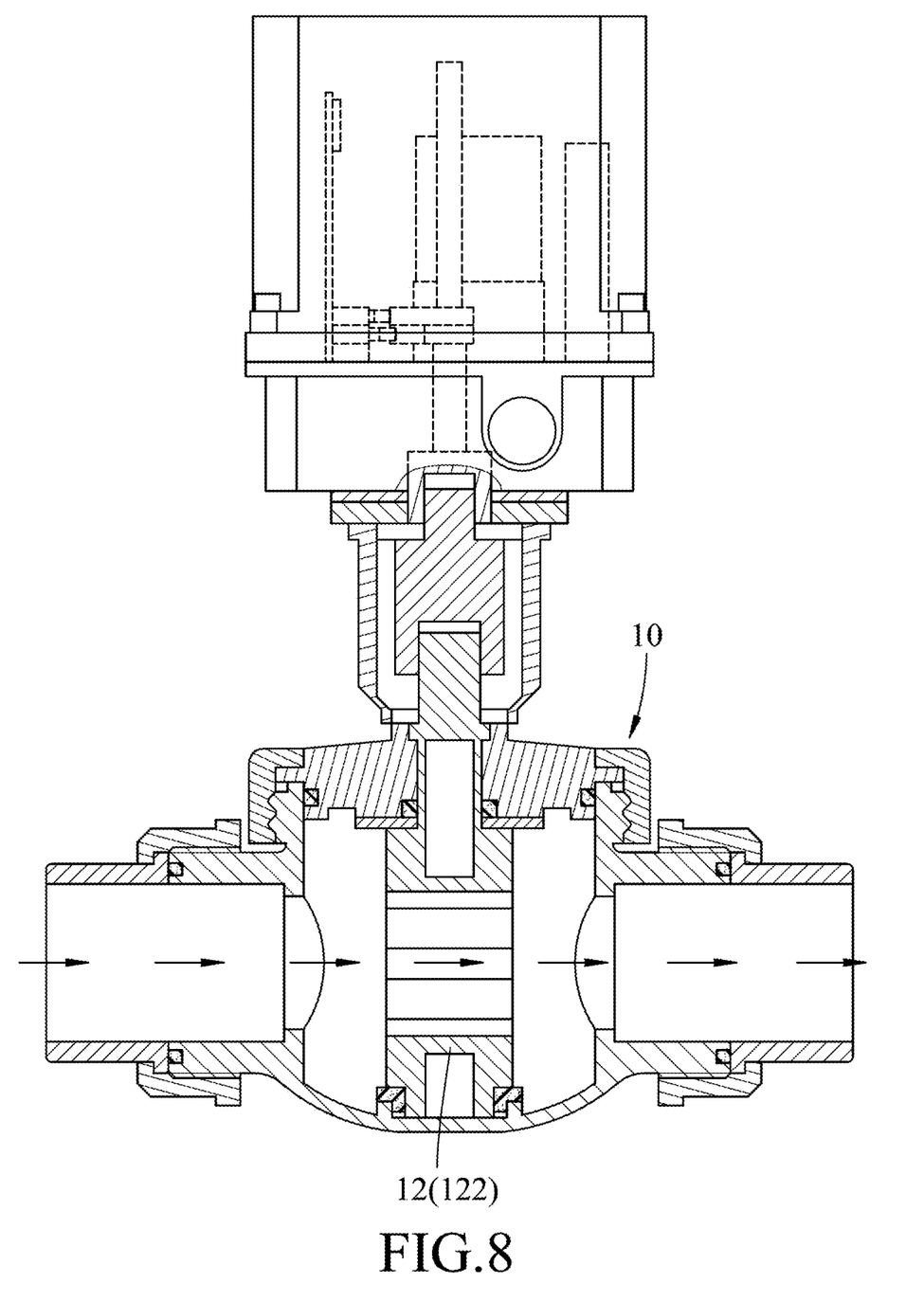
FIG. 8 is similar to FIG. 7, but illustrating the valve unit in an open state.

FIGS. 7 and 8 illustrate another variant of the valve unit 10 according to the disclosure. The valve unit 10 is a semi-cylindrical valve. The valve member 12 has a semi-cylindrical blocker 122. The valve member 12 is switchable between the closing state (see FIG. 7) and the opening state (see FIG. 8).

Figure 9:
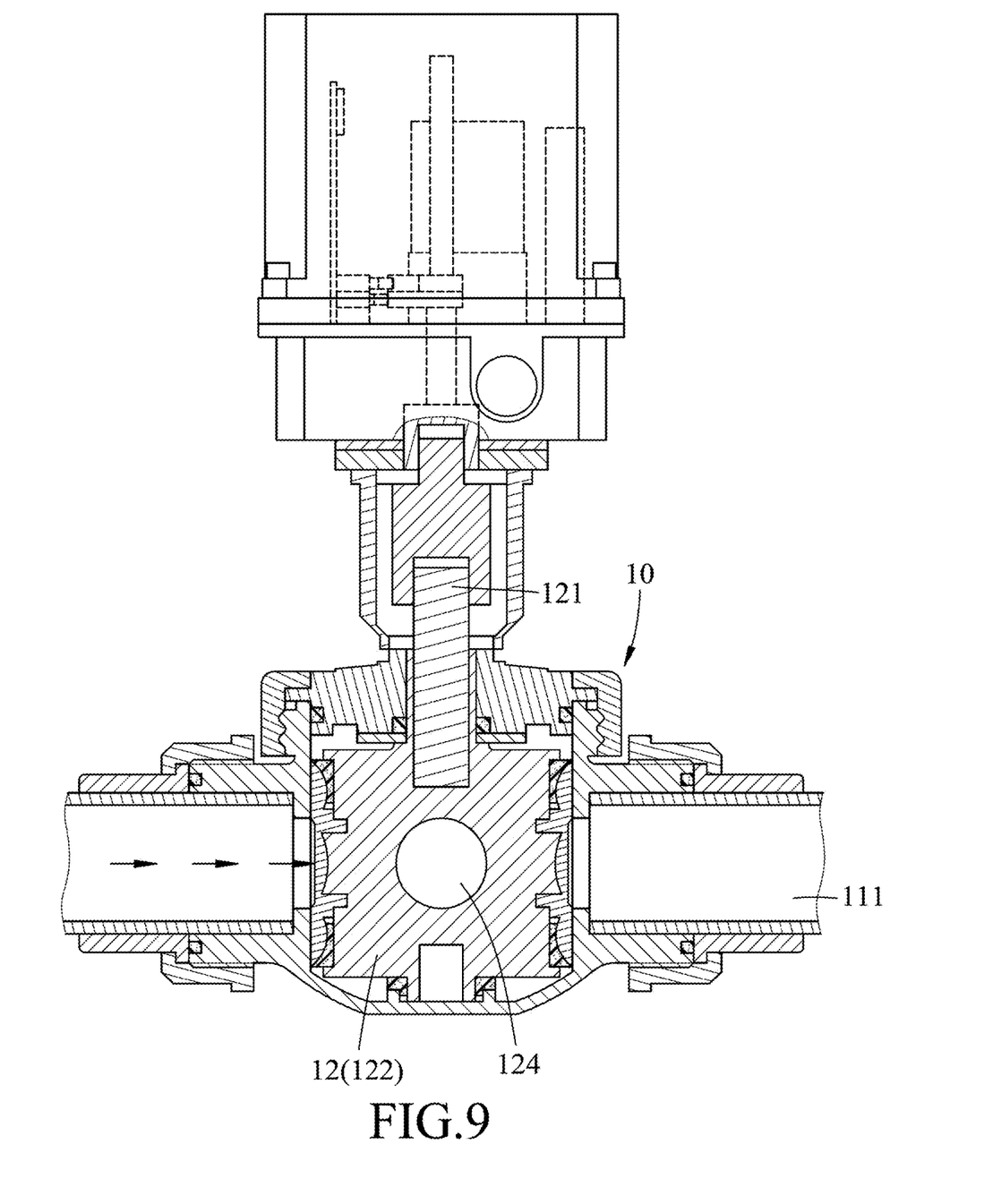
FIG. 9 is a partly sectional view illustrating the other variation of the valve unit that is a plug valve in a closing state.
Figure 10:
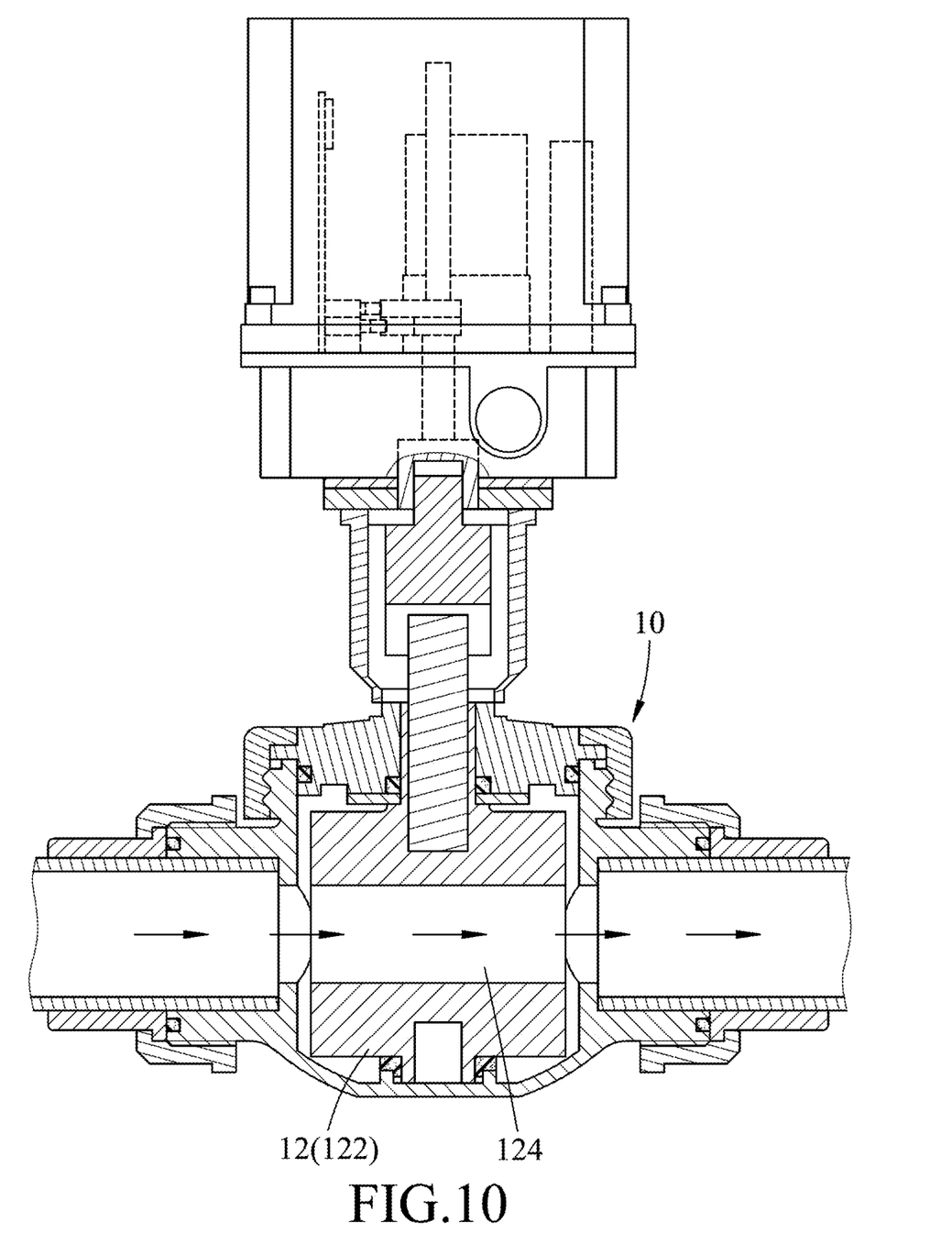
FIG. 10 is similar to FIG. 9, but illustrating the valve unit in an open state.

FIGS. 9 and 10 illustrate the other variant of the valve unit 10 according to the disclosure. The valve unit 10 is a plug valve. The valve member 12 has a plug-shaped blocker 122 disposed in the flow passageway 111 and connected to the driven portion 121 of the valve member 12. The plug-shaped blocker 122 has a passage hole 124 communicable to the flow passageway 111. The valve member 12 is switchable between the closing state (see FIG. 9) and the opening state (see FIG. 10).

Noteworthily, the electric valve 100 can be remotely controlled by a mobile handheld device (e.g., a smart phone) with using an application installed on the mobile handheld device.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An electric valve, comprising:
    a valve unit including a valve body and a valve member rotatably disposed in said valve body, said valve body having a flow passageway, said valve member having a driven portion extending outside of said valve body, said valve member being switchable between a closing state to close said flow passageway and an opening state to open said passageway;
    an adaptor having a first adaptor portion connected to said driven portion of said valve member, and a second adaptor portion opposite to said first adaptor portion;
    a drive unit including
        a rotation shaft having a driving portion connected to said second adaptor portion of said adaptor,
        a motor driving rotation of said rotation shaft,
        a backup battery pack,
        a circuit board electrically coupled to said motor and said backup battery pack, and
        a microprocessor control unit disposed on and electrically coupled to said circuit board;
    wherein said motor drives said valve member through said rotation shaft and said second adaptor portion to switch between the opening and closing states; and wherein said microprocessor control unit controls a time delay for switching the valve member from the opening state to the closing state.

2. The electric valve as claimed in claim 1, wherein
said driven portion of said valve member has a protruding block;
said first adaptor portion of said adaptor has a groove to complementarily engage said protruding block of said driven portion;
said second adaptor portion of said adaptor has a protruding block; and
said driving portion of said rotation shaft has a groove to complementarily engage said protruding block of said second adaptor portion.

3. The electric valve as claimed in claim 2, wherein
said valve unit is a ball valve;
said valve member has a ball-shaped blocker disposed in said flow passageway; and
said ball-shaped blocker has a passage hole communicable to said flow passageway.

4. The electric valve as claimed in claim 2, wherein
said valve unit is a rotary valve; and
said valve member has a disc-shaped blocker disposed in said flow passageway and connected to said driven portion of said valve member.

5. The electric valve as claimed in claim 2, wherein
said valve unit is a plug valve; and
said valve member has a plug-shaped blocker disposed in said flow passageway and connected to said driven portion of said valve member.

6. The electric valve as claimed in claim 1, wherein
said drive unit further includes a reduction gearbox, a casing covering a top side of said reduction gearbox, and a holding bracket disposed at a bottom side of said reduction gearbox and connected to said valve body;
said rotation shaft is partially received in and extends outside of said reduction gear box;
said motor is disposed on said top side of said reduction gearbox, said rotation shaft being driven by said motor through said reduction gearbox; and
said backup battery pack and said circuit board are disposed on said top side of said reduction gearbox.

* * * * *